United States Patent
Kawamura et al.

(10) Patent No.: US 11,840,802 B2
(45) Date of Patent: Dec. 12, 2023

(54) POROUS LAYER STRUCTURE AND METHOD FOR PRODUCING SAME

(71) Applicant: DAINICHISEIKA COLOR & CHEMICALS MFG. CO., LTD., Chuo-ku (JP)

(72) Inventors: Ryo Kawamura, Kodaira (JP); Toshiki Yamada, Kita-ku (JP); Kazuya Sasaki, Abiko (JP)

(73) Assignee: DAINICHISEIKA COLOR & CHEMICALS MFG. CO., LTD., Chuo-ku (JP)

(*) Notice: Subject to any disclaimer, the term of this patent is extended or adjusted under 35 U.S.C. 154(b) by 379 days.

(21) Appl. No.: 17/278,488

(22) PCT Filed: Sep. 20, 2019

(86) PCT No.: PCT/JP2019/037046
§ 371 (c)(1),
(2) Date: Mar. 22, 2021

(87) PCT Pub. No.: WO2020/066920
PCT Pub. Date: Apr. 2, 2020

(65) Prior Publication Data
US 2022/0034027 A1    Feb. 3, 2022

(30) Foreign Application Priority Data
Sep. 26, 2018    (JP) ................. 2018-180057

(51) Int. Cl.
*D06N 3/14* (2006.01)
*D06N 3/00* (2006.01)

(52) U.S. Cl.
CPC ............ *D06N 3/14* (2013.01); *D06N 3/0036* (2013.01); *D06N 3/0043* (2013.01); *D06N 2211/28* (2013.01)

(58) Field of Classification Search
CPC ........................................ D06N 3/14
See application file for complete search history.

(56) References Cited

U.S. PATENT DOCUMENTS 3,655,311 A * 4/1972 Porter ................... B29C 44/467
                                                    425/168
3,916,023 A * 10/1975 Porter .................. G05D 11/132
                                                    261/DIG. 26
(Continued)

FOREIGN PATENT DOCUMENTS

CN    1334832 A    2/2002
CN    1732082 A    2/2006
(Continued)

OTHER PUBLICATIONS

Combined Chinese Office Action and Search Report dated Nov. 2, 2022 in Patent Application No. 201980062237.3 (with English translation of Category of Cited Documents), 6 pages.
(Continued)

*Primary Examiner* — Andrew T Piziali
(74) *Attorney, Agent, or Firm* — Oblon, McClelland, Maier & Neustadt, L.L.P.

(57) ABSTRACT

Provided is a porous layer structure including a base material (A) and a urethane foam layer provided on the base material (A), wherein the urethane foam layer is a foam layer formed by foaming a urethane prepolymer having an isocyanate group, the urethane foam layer has a density of 0.10 to 0.60 g/cm$^3$, and the urethane prepolymer substantially contains no volatile component and satisfies a predetermined composition.

7 Claims, 1 Drawing Sheet

(56) References Cited

U.S. PATENT DOCUMENTS

| | | | |
|---|---|---|---|
| 3,959,049 A | 5/1976 | Tanaka et al. | |
| 2003/0104194 A1 | 6/2003 | Honjo | |
| 2006/0079589 A1 | 4/2006 | Tadokoro et al. | |
| 2007/0197116 A1 | 8/2007 | Yakake et al. | |
| 2016/0046757 A1* | 2/2016 | Landers | C08J 9/0042 |
| | | | 521/170 |

FOREIGN PATENT DOCUMENTS

| | | |
|---|---|---|
| CN | 103483529 A | 1/2014 |
| EP | 0 002 464 A1 | 6/1979 |
| IT | 7852208 | 12/1978 |
| JP | 50-35301 | 4/1975 |
| JP | 51-19101 | 2/1976 |
| JP | 56-116725 A | 9/1981 |
| JP | 2003-246830 A | 9/2003 |
| JP | 2003-306523 A | 10/2003 |
| JP | 2003-306526 A | 10/2003 |
| JP | 2004-21 6880 A | 8/2004 |
| JP | 3776428 B2 | 5/2006 |
| TW | 200906618 A | 2/2009 |

OTHER PUBLICATIONS

Taiwanese Office Action dated Aug. 24, 2022 in Taiwanese Patent Application No. 11120831180, 4 pages.
International Search Report dated Dec. 17, 2019 in PCT/JP2019/037046 filed on Sep. 20, 2019, 2 pages.
Extended European Search Report dated May 9, 2022, in corresponding European Patent Application No. 19866893.1, 7 pages.

* cited by examiner

POROUS LAYER STRUCTURE AND METHOD FOR PRODUCING SAME

TECHNICAL FIELD

The present invention relates to a porous layer structure and a method for producing the porous layer structure.

BACKGROUND ART

Urethane prepolymers are used for adhesives, paints, sealing materials, and the like, and in particular, moisture-curable urethane prepolymers are advantageous in that they can be used as a single liquid because they are cured by moisture in the air. Such a urethane prepolymer has, in the molecule, a functional group (for example, an isocyanate group) capable of forming a crosslinked structure by reacting with water (moisture) present in the air or in a base material to which the urethane prepolymer is applied. Various kinds of urethane prepolymers which are uncured and liquid or solid at normal temperature have been developed depending on applications.

In addition, since the urethane prepolymer reacts with water (moisture) and foams, the urethane prepolymer may be used as a polyurethane foam sheet. Since polyurethane foam sheets have excellent softness, stretchability, and cushioning properties, they are used in applications such as clothing, boots, and supporters in combination with various fabrics. Conventionally, in the production of the polyurethane foam sheet, an organic solvent has been used. However, in recent years, the use of the organic solvent has been regulated or prohibited due to the harmfulness to the human body and the environmental problem, and it is urgent to shift to a method for producing a polyurethane foam sheet without using an organic solvent.

For example, PTL 1 discloses a production method in which a harmful organic solvent is not used, a drying step and an extraction step of the organic solvent are not required, and energy consumption required for evaporation and removal of the solvent is reduced.

CITATION LIST

Patent Literature

PTL 1: JP 3776428 B

SUMMARY OF INVENTION

Technical Problem

The method described in PTL 1 is characterized in that water vapor is brought into contact with a sheet-shaped liquid mixture to cause water foaming of the liquid mixture. However, in this method, since the sheet-shaped liquid mixture is bonded to a base material sheet after foaming, the adhesion between the sheet-shaped liquid mixture and the base material sheet is reduced. Even in urethane applications requiring good softness, good adhesion between the foam layer and the base material layer is required from the viewpoint of durability, but it is difficult for the sheet obtained in PTL 1 to satisfy this requirement.

In view of the above, an object of the present invention is to provide a porous layer structure which can be produced without using an organic solvent and can exhibit good softness and durability, and a method for producing the porous layer structure.

Solution to Problem

As a result of intensive studies to solve the above problems, the present inventors have found that the problems can be solved by a porous layer structure including a urethane foam layer formed by foaming a specific urethane prepolymer, and have arrived at the present invention. That is, the present invention is as follows.

[1] A porous layer structure including a base material (A) and a urethane foam layer provided on the base material (A), wherein the urethane foam layer is a foam layer formed by foaming a urethane prepolymer having an isocyanate group, the urethane foam layer has a density of 0.10 to 0.60 g/cm$^3$, and the urethane prepolymer substantially contains no volatile component and satisfies at least any one of the following compositions (A) to (C):

(A) a composition containing a polyol component (a) having a gel point of 20 mL or more and less than 30 mL in an amount of 50% by mass or more based on all polyol components;

(B) a composition containing a polyol component (b) having a gel point of 30 mL or more and less than 50 mL in an amount of 30% by mass or more based on all polyol components; and (C) a composition containing a polyol component (c) having a gel point of 50 mL or more in an amount of 10% by mass or more based on all polyol components.

[2] The porous layer structure according to [1], wherein the base material A before the urethane foam layer is provided is a water-containing base material A.

[3] The porous layer structure according to [1] or [2], wherein the base material A is a polyester base fabric, and a peeling force for peeling the urethane foam layer from the base material A when the urethane foam layer is 200 μm thick is 1.5 kgf/inch or more.

[4] The porous layer structure according to any one of [1] to [3], wherein the urethane prepolymer contains a polycarbonate polyol component in an amount of 50% by mass or more based on all polyol components.

[5] The porous layer structure according to any one of [1] to [4], wherein in the urethane prepolymer, a ratio of an isocyanate group equivalent of a polyisocyanate component to a hydroxy group equivalent of all the polyol components is 1.33 to 5.0.

[6] A method for producing the porous layer structure according to any one of [1] to [5], including:

a water-containing treatment step of base material of subjecting a base material A to a water-containing treatment to obtain a water-containing base material A;

a urethane prepolymer coating step of coating a urethane prepolymer having an isocyanate group onto a base material B to form a urethane prepolymer coating film;

a coating film structure production step of bonding the water-containing base material A and the urethane prepolymer coating film formed on the base material B to produce a coating film structure; and an aging treatment step of subjecting the coating film structure to an aging treatment, wherein the urethane prepolymer substantially contains no volatile component and satisfies at least any one of the following compositions (A) to (C):

(A) a composition containing a polyol component (a) having a gel point of 20 mL or more and less than 30 mL in an amount of 50% by mass or more based on all polyol components;

(B) a composition containing a polyol component (b) having a gel point of 30 mL or more and less than 50 mL in an amount of 30% by mass or more based on all polyol components; and (C) a composition containing a polyol component (c) having a gel point of 50 mL or more in an amount of 10% by mass or more based on all polyol components.

[7] The method for producing the porous layer structure according to [6], further including a water vapor contact step of bringing water vapor into contact with the coating film structure between the coating film structure production step and the aging treatment step.

Advantageous Effects of Invention

According to the present invention, it is possible to provide a porous layer structure which can be produced without using an organic solvent and can exhibit good softness and durability, and a method for producing the porous layer structure.

DESCRIPTION OF EMBODIMENTS

Figure 1:
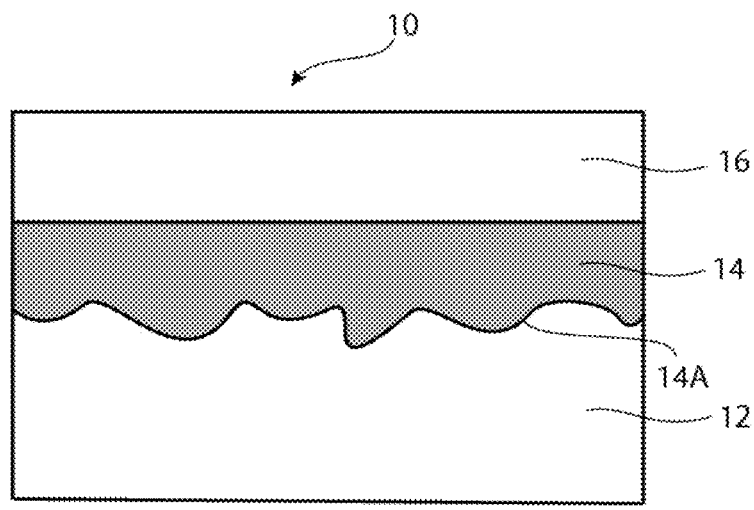
FIG. 1 is a schematic cross-sectional view showing a porous layer structure according to the present embodiment.

Hereinafter, an embodiment of the present invention (present embodiment) will be described in detail, but the present invention is not limited to the embodiment.

[1. Porous Layer Structure]

The porous layer structure of the present embodiment includes a base material A and a urethane foam layer provided on the base material A. The urethane foam layer is a foam layer formed by foaming a urethane prepolymer having an isocyanate group. That is, the urethane foam layer is a foam layer formed of a foam of a urethane prepolymer having an isocyanate group.

The urethane foam layer is present so that a part of the urethane foam layer is penetrated into the inside of the base material A. As a result, the adhesion between the base material A and the urethane foam layer is improved, and the base material A and the urethane foam layer are not separated from each other, thereby exhibiting excellent durability. In addition, since the urethane foam layer is foamed, it has good softness while maintaining excellent durability.

In order to achieve both penetration into the inside of the base material A and good softness, in the present invention, the densities of the urethane foam layers are set to 0.10 to 0.60 g/cm$^3$, and a specific urethane prepolymer having an isocyanate group is used as the urethane prepolymer for forming the urethane foam layers.

The density of the urethane foam layer is related to the foaming ratio of the foam layer, and the lower the density, the higher the foaming ratio. The urethane foam layer having a density of 0.10 to 0.60 g/cm$^3$ provides good softness while maintaining adhesion to the base material A and the like.

The urethane prepolymer according to the present embodiment substantially contains no volatile component. That is, since the porous structure is produced without using an organic solvent, a problem of harmfulness and an environmental problem do not occur.

Here, in the present invention, "substantially containing no volatile component" means that volatile components such as organic solvents are not intentionally contained, and more specifically means that organic solvents are not present.

The urethane prepolymer having an isocyanate group according to the present invention satisfies at least any one of the following compositions (A) to (C):

(A) a composition containing a polyol component (a) having a gel point of 20 mL or more and less than 30 mL in an amount of 50% by mass or more based on all polyol components;

(B) a composition containing a polyol component (b) having a gel point of 30 mL or more and less than 50 mL in an amount of 30% by mass or more based on all polyol components; and (C) a composition containing a polyol component (c) having a gel point of 50 mL or more in an amount of 10% by mass or more based on all polyol components.

Here, the gel point can be determined as follows.

First, an N,N'-dimethylformamide (DMF) solution containing 1% by mass of a polyol component is prepared. Thereafter, distilled water is added dropwise to the solution while sufficiently stirring the solution with a propeller mixer to make the solution uniform, and the amount of water drop (mL) at the time when solidification of the polyol starts under a temperature condition of 25±1° C. and the solution becomes slightly cloudy is determined.

It is necessary to use DMF having a water content of 0.03% by mass or less for the measurement. In the case where the DMF solution is slightly clouded in advance, the amount of water drop when coagulation starts and the degree of cloudiness changes can be regarded as the gel point.

The gel point in the polyol components (a) to (c) indicates the degree of hydrophilicity, and the polyol component (a) having a gel point of not less than 20 mL and less than 30 mL has the lowest degree of hydrophilicity among the polyol components (a) to (c). Therefore, in order to obtain a foam layer that can be a synthetic artificial leather having good softness, in particular, a soft texture, it is preferable to contain the polyol component (a) in an amount of 50% by mass or more based on all polyol components.

The polyol as the polyol component (a) is a polyester polyol satisfying the above-mentioned gel point range, and specifically, examples of an alcohol component of the polyester polyol include ethylene glycol, diethylene glycol, triethylene glycol, propylene glycol, 1,2-propanediol, n-propanediol, 1,3-butanediol, 1,4-butanediol, 1,3-pentanediol, 1,5-pentanediol, 1,6-hexanediol, hexylene glycol, 3-methyl-1,5-pentanediol, 2-ethyl-1,3-hexanediol, 1,9-nonanediol, and neopentyl glycol, and examples of an acid component include dibasic acids such as terephthalic acid, isophthalic acid, malonic acid, glutaric acid, pimelic acid, suberic acid, succinic acid, adipic acid, azelaic acid, sebacic acid, and dodecanedioic acid. Examples of the combination of the diol component and the dibasic acid include a polyester diol in which the diol component and the dibasic acid are used alone or in combination of two or more, and it is preferable that at least one of ethylene glycol, diethylene glycol, 1,2-propanediol, and n-propanediol is contained as the alcohol component, or succinic acid or the like is contained as the acid component. The number average molecular weight of the polyol is not particularly limited, but is preferably 500 to 3000.

Further, the polyol component (b) having a gel point of 30 mL or more and less than 50 mL has a moderate degree of hydrophilicity among the polyol components (a) to (c). Therefore, in order to obtain a foam layer that can be a synthetic artificial leather having good softness, in particular, a soft texture, it is preferable to contain the polyol component (b) in an amount of 30% by mass or more based on all polyol components.

The polyol as the polyol component (b) is a polyester polyol satisfying the above-mentioned gel point range, and specifically, examples of the alcohol component of the polyester polyol include ethylene glycol, diethylene glycol, triethylene glycol, propylene glycol, 1,2-propanediol, n-propanediol, 1,3-butanediol, 1,4-butanediol, 1,3-pentanediol, 1,5-pentanediol, 1,6-hexanediol, hexylene glycol, 3-methyl-1,5-pentanediol, 2-ethyl-1,3-hexanediol, 1,9-nonanediol, and neopentyl glycol, and examples of the acid component include dibasic acids such as terephthalic acid, isophthalic acid, malonic acid, glutaric acid, pimelic acid, suberic acid, succinic acid, adipic acid, azelaic acid, sebacic acid, and dodecanedioic acid. Examples of the combination of the diol component and the dibasic acid include a polyester diol in which the diol component and the dibasic acid are used alone or in combination of two or more, and it is preferable that at least one of ethylene glycol, diethylene glycol, 1,2-propanediol, and n-propanediol is contained as the alcohol component, or succinic acid is contained as the acid component. The number average molecular weight of the polyol is not particularly limited, but is preferably 500 or more and less than 2000.

Further, since the polyol component (c) having a gel point of 50 mL or more has the highest degree of hydrophilicity among the polyol components (a) to (c), in order to obtain a foam layer that can be a synthetic artificial leather having good softness, in particular, a soft texture, it is preferable to contain the polyol component (c) in an amount of 10% by mass or more based on all polyol components.

The polyol as the polyol component (c) is specifically a polyether polyol satisfying the above-mentioned gel point range, and specific examples thereof include polyoxyethylene glycol (PEG), an EO/PO copolymer, and an EO/THF copolymer. The number average molecular weight of the polyol is not particularly limited, but is preferably 500 to 6000.

Hereinafter, the urethane prepolymer, the base material, the urethane foam layer, and the like of the present embodiment will be described in more detail.

<Urethane Prepolymer>

As described above, the urethane prepolymer is composed of a polyol component satisfying at least any one of the compositions (A) to (C), an isocyanate component, and other components as appropriate. That is, the urethane prepolymer having an isocyanate group of the present embodiment is a urethane prepolymer obtained from a polyol component and a polyisocyanate component. In particular, the urethane prepolymer is a moisture-curable urethane prepolymer, and the porous layer structure of the present invention is obtained by utilizing foaming at the time of moisture curing.

(Polyol Component)

The urethane prepolymer may contain a polyol component other than the polyol components (a) to (c) as long as the urethane prepolymer satisfies at least any one of the compositions (A) to (C) described above.

For example, a combination of each of the polyol components (a) to (c) and a polyol component (x) having a gel point of less than 20 mL in the gel point measurement may be used. In the case of a combination of these, for example, it is possible to improve initial adhesive strength, improve flexibility, impart chemical resistance and durability, adjust viscosity, and the like while securing foam ability.

Specific examples of the polyol to be the polyol component (x) include polyether polyols such as polyoxytetramethylene glycol (PTMG) and polyoxypropylene glycol (PPG), polyester polyols having a gel point of less than 20 mL, caprolactone-based polyols, and polycarbonate-based polyols.

In particular, in order to improve hydrolysis resistance and obtain better durability, a polycarbonate polyol component may be contained. When the polycarbonate polyol component is contained, it is preferably contained in an amount of 50% by mass or more, and more preferably contained in an amount of 70 to 90% by mass, based on all polyol components.

The polycarbonate polyol as the polycarbonate polyol component is not particularly limited as long as it is a conventionally known polycarbonate polyol obtained by reacting an alkanediol with a carbonate compound such as dialkyl carbonate, alkylene carbonate, or diphenyl carbonate.

(Isocyanate Component)

The isocyanate used as a synthesis component of the urethane prepolymer according to the present embodiment is not particularly limited, but a bifunctional polyisocyanate such as an aliphatic diisocyanate, an alicyclic diisocyanate, or an aromatic diisocyanate is preferable.

Specific examples of the polyisocyanate as the isocyanate component include tolylene diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate-diphenyl ether, mesitylene diisocyanate, 4,4'-diphenylmethane diisocyanate, durylene diisocyanate, 1,5-naphthalene diisocyanate, benzidine diisocyanate, o-nitrobenzidine diisocyanate, 4,4-diisocyanate dibenzyl, 1,4-tetramethylene diisocyanate, 1,5-pentamethylene diisocyanate, 1,6-hexamethylene diisocyanate, 1,10-decamethylene diisocyanate, 1,4-cyclohexylene diisocyanate, xylene diisocyanate, 4,4'-methylenebis(cyclohexyl isocyanate), 1,5-tetrahydronaphthalene diisocyanate, isophorone diisocyanate, and dicyclohexylmethane 4,4'-diisocyanate. Among these, it is preferable to contain at least 4,4'-diphenylmethane diisocyanate (MDI).

In the case where light resistance is required, for example, in vehicle applications or light color applications, it is preferable to use an aliphatic diisocyanate or an alicyclic diisocyanate in combination with 4,4'-diphenylmethane diisocyanate.

The polyisocyanate is a linear aliphatic diisocyanate having 4 to 10 carbon atoms, and the linear aliphatic diisocyanate having 4 to 10 carbon atoms is preferably contained in an amount of 10 to 50 mol %, and more preferably 20 to 40 mol %. When the linear aliphatic diisocyanate having 4 to 10 carbon atoms is contained in an amount of 10 to 50 mol %, more favorable curability can be exhibited. The linear aliphatic diisocyanate having 4 to 10 carbon atoms is preferably 1,5-pentamethylene diisocyanate or 1,6-hexamethylene diisocyanate.

The ratio of the polyol to the polyisocyanate in the urethane prepolymer according to the present embodiment is such that the ratio of the isocyanate group equivalent of the polyisocyanate component to the hydroxy group equivalent of all polyol components (NCO/OH) is preferably 1.33 to 5.0, and more preferably 1.5 to 3.0. When NCO/OH is 1.33 to 5.0, both the softness and the peel strength from the base material A are more favorable.

The urethane prepolymer of the present embodiment may be blended with a polyisocyanate crosslinking agent having 3 to 5 functional groups and a terminal isocyanate group as a blending component. From the viewpoint of curability and adhesion to a base material, the content of the polyisocyanate crosslinking agent is preferably 30% by mass or less, and more preferably 2 to 20% by mass, with respect to 100 parts by mass of the urethane prepolymer.

The method for producing the urethane prepolymer according to the present embodiment is not particularly limited. For example, the urethane prepolymer according to the present embodiment can be produced by mixing the above-described polyol with a polyisocyanate such that NCO/OH is 1.33 to 5.0 and reacting the mixture at 80 to 120° C. for about 60 to 120 minutes.

In addition, in the urethane prepolymer, a polyfunctional polyisocyanate, a thermoplastic polymer, a tackifier resin, a catalyst, a pigment, an antioxidant, an ultraviolet absorber, a surfactant, a flame retardant, a filler, a foaming agent, and the like may be blended in an appropriate amount as necessary.

(Base Material)

As the base material A, a conventionally known synthetic artificial leather base material can be used, and examples thereof include a woven fabric formed by twill weaving, plain weaving, or the like, a raised fabric obtained by mechanically raising a cotton fabric of the woven fabric, a rayon fabric, a nylon fabric, a polyester fabric, a Kevlar fabric, a nonwoven fabric (polyester, nylon, various latexes), various films, and sheets.

The base material A before the urethane foam layer is provided is preferably a water-containing base material A. That is, since the base material A contains water in advance, the urethane foam layer is easily formed, the degree of penetration of the urethane foam layer into the base material is easily controlled, and the adhesion therebetween is further improved.

The water content of the water-containing base material A is preferably 10 to 70% by mass, and more preferably 15 to 50% by mass. When the water content is 10 to 70% by mass, the foaming speed and the foaming density can be controlled, and a synthetic artificial leather having good softness and excellent adhesion to a base material can be produced.

When the base material A is a 1000 μm-thick polyester base fabric and the urethane foam layer is 200 μm thick, the peeling force for peeling the urethane foam layer from the base material A is preferably 1.5 kgf/inch or more, and more preferably 2.0 kgf/inch or more. When the peel strength is 1.5 kgf/inch or more, for example, it is possible to obtain adhesion (peel strength) with the base material A exceeding a level that causes no practical problem as a foamed synthetic artificial leather. The peeling force can be measured by the method described in "Peel strength test" in Examples.

In the urethane foam layer of the porous structure, the base material B is preferably provided on the side where the base material A is not formed. The base material B in this case corresponds to, for example, a skin layer, and examples thereof include, but are not particularly limited to, those formed of a coating material for forming a skin layer, such as solvent-based polyurethane, water-based polyurethane, and TPU.

The thickness of the base material A is not particularly limited as long as the base material A is made of a material that can be treated with water. In addition, the thickness of the base material B is not particularly limited, but is preferably 0.01 to 0.2 mm, more preferably 0.02 to 0.1 mm, so as not to damage the texture of the synthetic artificial leather produced.

(Urethane Foam Layer)

The density of the urethane foam layer formed by foaming the urethane prepolymer having an isocyanate group is preferably 0.10 g/cm$^3$ to 0.60 g/cm$^3$, and more preferably 0.2 g/cm$^3$ to 0.5 g/cm$^3$ from the viewpoint of achieving both good softness and high peel strength. The density of the foam layer can be measured by the method described in Examples.

The thickness of the urethane foam layer is preferably 0.05 to 1.0 mm, and more preferably 0.1 to 0.8 mm.

As described above, the porous layer structure of the present embodiment having the urethane foam layer formed by foaming the urethane prepolymer (moisture-curable urethane prepolymer) according to the present embodiment during moisture curing is suitable for shoes, clothing, bags, furniture, vehicle interior materials (for example, instrument panels, doors, consoles, and seats), heat insulating materials, sound absorbing materials, impact absorbing materials, and the like.

[2. Production Method of Porous Layer Structure]

A method for producing a porous layer structure according to the present embodiment includes: a water-containing treatment step of base material of subjecting a base material A to a water-containing treatment to obtain a water-containing base material A; a urethane prepolymer coating step of coating a urethane prepolymer having an isocyanate group onto a base material B to form a urethane prepolymer coating film; a coating film structure production step of bonding the water-containing base material A and the urethane prepolymer coating film formed on the base material B to produce a coating film structure; and an aging treatment step of subjecting the coating film structure to an aging treatment.

Each step will be described below.

(Water-Containing Treatment Step of Base Material)

For example, in the case where the porous layer structure is produced by a roll-to-roll method, the base material A in the form of a roll is allowed to pass through water in an impregnation tank containing water while being fed out as the water-containing treatment step. Thus, the base material A is impregnated with water. The impregnation time in the impregnation tank varies depending on the material of the base material A, but the time for which moisture is sufficiently absorbed in the base material is preferably, for example, about 5 to 60 seconds. Thereafter, unnecessary water is removed by passing between two rolls to obtain the water-containing base material A. At this time, the water content can be adjusted by adjusting the gap between the two rolls. After that, the water-containing base material A is fed to, for example, a laminating roll side located downstream in order to be bonded to the base material B coated with the urethane prepolymer.

The water-containing treatment step may be a method in which the base material A is brought into contact with vapor or mist other than the method in which the base material A is allowed to pass through water in the impregnation tank containing water.

(Urethane Prepolymer Coating Step)

For example, a urethane prepolymer coating film is formed by coating a urethane prepolymer stored in a melter or the like to a roll-shaped base material B serving as a skin while the base material B is being fed. Here, since the urethane prepolymer does not contain water, it hardly foams after the formation of the coating film. Further, this step is also effective from the viewpoint of pot life.

As described above, the urethane prepolymer has an isocyanate group, substantially contains no volatile component, and satisfies at least any one of the compositions (a) to (c) described above. The urethane prepolymer is stored in the melter or the like and prepared for coating in the urethane prepolymer coating step.

The thickness of the urethane prepolymer coating film depends on the viscosity and composition of the urethane prepolymer, but is preferably 50 to 500 μm, and more preferably 100 to 300 μm.

The base material B on which the urethane prepolymer coating film is formed is fed to, for example, the laminating roll side in order to be bonded to the water-containing base material A.

(Coating Film Structure Production Step)

In order to bond the urethane prepolymer coating film formed on the base material B to the base material A, the water-containing base material A and the base material B are fed to, for example, a laminating roll composed of a pair of rolls, and are laminated here to produce a coating film structure. Thereafter, the film is wound into a roll and sent to an aging treatment step for performing a foaming treatment.

(Aging Treatment Step)

In the aging treatment step, the aging treatment is performed by holding the roll-shaped coating film structure in a state of 15 to 80° C. and 40 to 95% RH for 48 to 120 hours. By this aging treatment, foaming occurs, and the porous layer structure of the present embodiment is produced.

(Water Vapor Contact Step)

In addition, in the present production method, it is preferable to include a water vapor contact step of bringing water vapor into contact with the coating film structure between the coating film structure production step and the aging treatment step. In the water vapor contact step, the atmosphere is set to 30 to 60° C. (preferably 35 to 55° C.) and 80% RH or more (preferably 85% RH or more), and the time in the atmosphere is preferably set to 20 seconds or more (preferably 25 to 60 seconds) depending on the temperature condition and the humidity condition.

Since the water content of the coating film structure can be improved by the water vapor contact step, a favorable foaming ratio can be easily obtained in the subsequent aging treatment step. That is, the foaming degree can be favorably controlled.

In the process described above, foaming does not occur after the formation of the coating film of the urethane prepolymer. Therefore, subsequent bonding can be performed in a state where there is no foaming (that is, no bubble). As a result, high adhesion between the base material and the urethane foam layer can be achieved. Since sufficient foaming can be performed in the aging treatment step, a urethane foam layer having good softness is formed while maintaining high adhesion.

As described above, the porous layer structure according to the present embodiment can exhibit good softness and adhesion (peeling force) to the base material A, and this is considered to be due to the following configuration.

Figure 2:
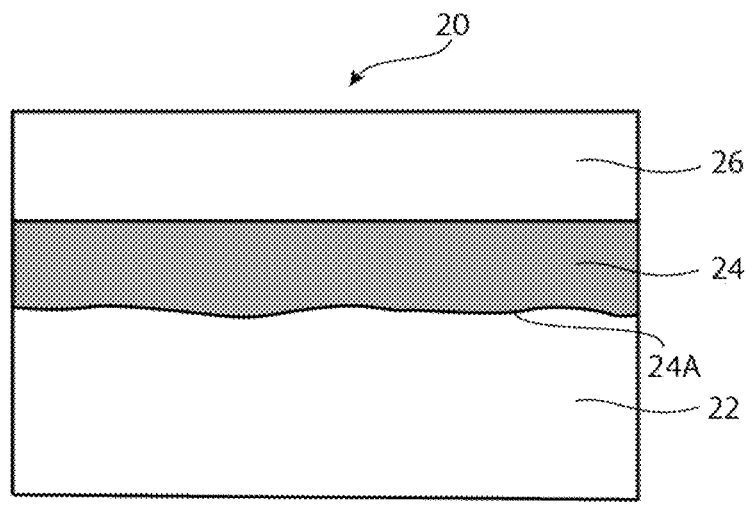
FIG. 2 is a schematic cross-sectional view showing a prior art porous layer structure.

That is, first, in a conventional porous layer structure 20 produced without using the production method of the present invention, as shown in FIG. 2, a lower surface 24A of a urethane foam layer 24 between a base material A 22 and a base material B 26 is hardly penetrated into a base material A 22 side. This is because, in the conventional method, after the foamed urethane prepolymer is coated, it is bonded to a base fabric which is not particularly pre-treated (for example, water-containing treatment), and therefore, the adhesion between the urethane foam layer 24 and the base material A 22 is not as large as that of the present invention.

On the other hand, in a porous layer structure 10 produced by the production method of the present invention, as shown in FIG. 1, since a lower surface 14A of a urethane foam layer 14 between a base material A 12 and a base material B 16 is moderately penetrated into a base material A12 side, it is considered that the adhesion between the urethane foam layer 14 and the base material A12 becomes extremely large due to an anchor effect.

From the viewpoint of obtaining good adhesion by the anchor effect, as the degree of penetration of the foam layer into the base material A, it is preferable that the foam layer is impregnated at least approximately 10% or more from the surface with respect to the thickness of the base material A. When the degree of penetration is less than 10%, it is difficult to sufficiently develop adhesion. However, in the case where the base material A is impregnated to such an extent that the foam layer occupies most of the thickness of the base material A, problems such as impaired softness and insufficient adhesion occur. The appropriate degree of impregnation varies depending on the type of the base material A, but is controlled by the water-containing treatment of the base material A before the bonding step.

The porous layer structure can be used as a synthetic artificial leather as it is, but may be appropriately subjected to a treatment such as coating with a surface treatment agent or bonding to another base material.

EXAMPLES

Next, the present invention will be described in more detail with reference to Examples and Comparative Examples. However, the present invention is not limited to these examples. The number average molecular weight was measured by GPC (in terms of polystyrene).

Examples 1 to 41 and Comparative Examples 1 to 34

(Synthesis of Urethane Prepolymer)

A 500-mL glass reaction vessel equipped with a stirrer, a thermometer, a gas inlet, and the like was charged with the polyol shown in Table 1 in each blending amount shown in Tables 2 to 10, dehydrated by heating under reduced pressure, sealed with nitrogen gas, stirred at an internal temperature of 100° C., charged with a predetermined amount of MDI (NCO/OH=1.3 to 5.0), and stirred and reacted for 120 minutes to obtain a urethane prepolymer.

TABLE 1

| Product name | Manufacturer | Composition | Glycol/POEO component ratio | Mn | Gel point (mL) |
|---|---|---|---|---|---|
| PTHF2000 | BASF | Polytetramethylene ether glycol | | 2000 | 4 |
| UH200 | Ube Industries, Ltd. | 1,6HXD homopolycarbonate diol | | 2000 | 9 |

TABLE 1-continued

| Product name | Manufacturer | Composition | Glycol/POEO component ratio | | Mn | Gel point (mL) |
|---|---|---|---|---|---|---|
| AC1520P | Tai Chin Chemical Industry Co., Ltd. | 1,4BD/AA diol | | | 2000 | 15 |
| AC4002 | Tai Chin Chemical Industry Co., Ltd. | (EG/1,4BD)/adipic acid polyester diol | 50 | 50 | 2000 | 19 |
| AC4001 | Tai Chin Chemical Industry Co., Ltd. | (EG/1,4BD)/adipic acid polyester diol | 55 | 45 | 1000 | 24 |
| AC4050 | Tai Chin Chemical Industry Co., Ltd. | (EG/1,4BD)/adipic acid polyester diol | 50 | 50 | 500 | 34 |
| AC4520 | Tai Chin Chemical Industry Co., Ltd | (DEG/1,4BD)/adipic acid polyester diol | 50 | 50 | 2000 | 23 |
| AC4510 | Tai Chin Chemical Industry Co., Ltd. | (DEG/1,4BD)/adipic acid polyester diol | 50 | 50 | 1000 | 31 |
| AC4505 | Tai Chin Chemical Industry Co., Ltd. | (DEG/1,4BD)/adipic acid polyester diol | 50 | 50 | 500 | 43 |
| AC3820 | Tai Chin Chemical Industry Co., Ltd. | 1,3PDO/succinic acid polyester diol | | | 2000 | 29 |
| AC3810 | Tai Chin Chemical Industry Co., Ltd. | 1,3PDO/succinic acid polyester diol | | | 1000 | 41 |
| AC3805 | Tai Chin Chemical Industry Co., Ltd. | 1,3PDO/succinic acid polyester diol | | | 500 | 48 |
| AC2105-100 | Tai Chin Chemical Industry Co., Ltd. | (EG/NPG)/(IPA/AA) polyester diol | 30 | 70 | 1000 | 22 |
| DC-1800E | NOF Corporation | Polyoxytetramethylene/polyoxyethylene glycol (random type) | 27 | 73 | 1800 | >50 |
| BP3025 | ENHOU Polymer Chemical Ind. Co., Ltd. | Polyoxypropylene/polyoxyethylene glycol (block type) | 70 | 30 | 2500 | >50 |
| BE7015 | ENHOU Polymer Chemical Ind. Co., Ltd. | Polyoxypropylene/polyoxyethylene glycol (block type) | 30 | 70 | 1500 | >50 |
| PEG2000 | Sanyo Chemical Industries, Ltd. | Polyoxyethylene glycol | | | 2000 | >50 |
| PEG1000 | Sanyo Chemical Industries, Ltd. | Polyoxyethylene glycol | | | 1000 | >50 |

EG = ethylene glycol
DEG = diethylene glycol
1,3PDO = 1,3-propanediol
1,4BD = 1,4-butanediol
1,6HXD = 1,6-hexanediol
AA = adipic acid
IPA = isophthalic acid The gel point was measured in the following manner.

First, after confirming the nonvolatile content of the sample (polyol), the sample was adjusted to a 10% by mass solution with DMF (water content: 0.03% by mass or less) and stirred with a propeller mixer to obtain a uniform DMF solution The DMF was collected as 10 g in a conical flask of 300 mL, 90 g of DMF was further added, and the mixture was uniformly stirred with a magnetic stirrer to obtain 100 g of a 1% by mass DMF solution. Distilled water was added dropwise to the solution from a burette while stirring the solution at a temperature of 25±1° C., and the amount of the solution added dropwise (the amount of water drop when the solution became slightly cloudy: mL) at which the cloudiness disappeared was defined as the gel point.

Note that DMF of a first grade reagent and that has been stored so as not to absorb moisture was used.

(Preparation of Skin)

Resamine NE-8875-30 (Dainichiseika Color & Chemicals Mfg. Co., Ltd.), which is a solvent-type urethane resin for synthetic artificial leather, Seikaseven BS-780 (Dainichiseika Color & Chemicals Mfg. Co., Ltd.), which is a colorant for synthetic artificial leather, and methyl ethyl ketone and dimethylformamide, which are dilution solvents, were mixed, uniformly coated on a release paper in a coating amount of 250 μm/wet with a bar coater, and then dried at 120° C. for 5 minutes to obtain a film with a skin (base material B) having a film thickness of 40 to 50 μm.

(Production of Synthetic Artificial Leather)

A urethane prepolymer heated to 100° C. was coated on the skin formed on the release paper so as to form a coating film having a coating film thickness of 100 μm, and a base fabric (base material A) with or without a water-containing treatment was press-bonded under heating by a laminating roll to prepare a coating film structure. As an aging treatment step, the coating film structure was aged by holding for 120 hours in an environment of a temperature of 25° C. and a relative humidity of 65%. The release paper was peeled off to obtain a synthetic artificial leather for evaluation. This was evaluated as follows. The results are shown in the tables below.

As the base fabric, a woven fabric (polyester circular knitted polyester base fabric, 1 mm thick) was used. The water-containing treatment was carried out by impregnating the base fabric with water and then uniformly squeezing the impregnated base fabric with a mangle having an appropriately adjusted roll interval. In addition, the desired water content was obtained by adjusting the roll interval of the mangle.

(Evaluation of Foaming Degree: Density of Foam Layer)

After the synthetic artificial leather for evaluation was prepared from each urethane prepolymer, the synthetic artificial leather was cut into a size of 10 cm×10 cm square. Separately, the base material A before the water-containing treatment was cut into 10 cm×10 cm, the skin formed on the release paper was cut into 10 cm×10 cm and peeled from the release paper, and the density of the foam layer was calculated by the following formula.

(1) Measurement and Calculation of Weight of Synthetic Artificial Leather:

The weight of the foam layer was determined from the weight of the entire synthetic artificial leather: A, the weight of the base material A: B, and the weight of the skin layer: C by the following formula.

Foam layer weight: $D=A-B-C$ (2) Measurement and Calculation of Thickness of Synthetic Artificial Leather:

The thickness of the foam layer was determined from the thickness of the entire synthetic artificial leather: E, the thickness of the base material A: F, and the thickness of the skin layer: G by the following formula.

Foam layer thickness: $H=E-F-G$ (3) Calculation of Density of Foam Layer:

The density of the foam layer was determined by the following formula.

Foam layer density = $D \div H \times 10 \times 10$ (g/cm$^3$)

When the density of the foam layer is 0.10 g/cm$^3$ to 0.60 g/cm$^3$, both good softness and high peel strength can be achieved.

(Peel Strength Test)

After a urethane-based HM tape having a 17 mm width was thermocompression-bonded to the synthetic artificial leather for evaluation, a strip-shaped measurement sample having a 25 mm width was prepared, and for the measurement sample, the tensile adhesive strength was measured at a rate of 200 mm/min by AGS-J (Shimadzu Corporation). When the tensile adhesive strength was 1.5 kgf/inch or more, it was determined that the foamed synthetic artificial leather had adhesiveness (peel strength) with the base material A exceeding a level causing no practical problem.

(Hydrolysis Resistance Test)

The urethane prepolymer was coated on a release paper so as to have a film thickness of 40 to 50 μm, and aged for 120 hours in an atmosphere of 25° C. and 60% RH to obtain a film used in a hydrolysis resistance test. The film from which the release paper had been peeled off was placed in an atmosphere of 70° C. and 95% RH, and a durability test was conducted every week for up to 7 weeks, and a tensile strength test was conducted using AGS-J (Shimadzu Corporation). The evaluation indexes were as follows.

A period in which the breaking strength retention rate is maintained at 50% or more is 1 to 4 weeks: C A period in which the breaking strength retention rate is maintained at 50% or more is 5 to 6 weeks: B A period in which the breaking strength retention rate is maintained at 50% or more is 7 weeks or more: A A and B are acceptable.

[Pass/Fail Determination]

In each table, the results of the determination are shown as "Pass" when the densities of the foam layers are 0.1 to 0.6 g/cm$^3$ and the criteria for peel strength (1.5 kgf/inch or more) are met, and as "Fail" when the densities of the foam layers are not 0.1 to 0.6 g/cm$^3$ or the criteria for peel strength are not met.

TABLE 2

| Raw material | | Comp. Ex. 1 | Comp. Ex. 2 | Comp. Ex. 3 | Comp. Ex. 4 | Ex. 1 | Ex. 2 | Comp. Ex. 5 | Ex. 3 |
|---|---|---|---|---|---|---|---|---|---|
| PTHF2000 | gel point: 4 mL | 100 | | | | | 50 | 60 | |
| UH200 | gel point: 9 mL | | 100 | | | | | | |
| AC1520P | gel point: 15 mL | | | 100 | | | | | |
| AC4002 | gel point: 19 mL | | | | 100 | | | | |
| AC2105-100 | gel point: 22 mL | | | | | 100 | 50 | 40 | |
| AC4520 | gel point: 23 mL | | | | | | | | 100 |
| AC4001 | gel point: 24 mL | | | | | | | | |
| AC8820 | gel point: 29 mL | | | | | | | | |
| MDI | | 25 | 25 | 25 | 25 | 50 | 37.5 | 35 | 25 |
| NCO/OH | | 2.0 | 2.0 | 2.0 | 2.0 | 2.0 | 2.0 | 2.0 | 2.0 |
| Water-containing Treatment of Base Material (Water Content) | | Yes (30%) | Yes (30%) | Yes (30%) | Yes (30%) | Yes (30%) | Yes (30%) | Yes (30%) | Yes (30%) |
| Foam Layer Thickness (μm) | | 80 | 70 | 75 | 110 | 170 | 150 | 120 | 140 |
| Foam Layer Density (g/cm$^3$) | | 0.80 | 0.80 | 0.75 | 0.65 | 0.45 | 0.55 | 0.65 | 0.57 |
| Peel Strength (kgf/inch) | | 1.2 | 1.8 | 1.7 | 2.3 | 3.8 | 4.0 | 4.5 | 4.1 |
| Pass/Fail Determination | | Fail | Fail | Fail | Fail | Pass | Pass | Fail | Pass |

| Raw material | | Ex. 4 | Comp. Ex. 6 | Ex. 5 | Ex. 6 | Comp. Ex. 7 | Ex. 7 | Ex. 8 | Comp. Ex. 8 |
|---|---|---|---|---|---|---|---|---|---|
| PTHF2000 | gel point: 4 mL | 50 | 60 | | 50 | 60 | | 50 | 60 |
| UH200 | gel point: 9 mL | | | | | | | | |
| AC1520P | gel point: 15 mL | | | | | | | | |
| AC4002 | gel point: 19 mL | | | | | | | | |
| AC2105-100 | gel point: 22 mL | | | | | | | | |
| AC4520 | gel point: 23 mL | 50 | 40 | | | | | | |
| AC4001 | gel point: 24 mL | | | 100 | 50 | 40 | | | |
| AC8820 | gel point: 29 mL | | | | | | 100 | 50 | 40 |
| MDI | | 87.5 | 35 | 50 | 87.5 | 35 | 25 | 37.5 | 35 |
| NCO/OH | | 2.0 | 2.0 | 2.0 | 2.0 | 2.0 | 2.0 | 2.0 | 2.0 |
| Water-containing Treatment of | | Yes | Yes | Yes | Yes | Yes | Yes | Yes | Yes |

TABLE 2-continued

| | | | | | | | | |
|---|---|---|---|---|---|---|---|---|
| Base Material (Water Content) | (30%) | (30%) | (30%) | (30%) | (30%) | (30%) | (30%) | (30%) |
| Foam Layer Thickness (μm) | 140 | 110 | 150 | 140 | 110 | 160 | 160 | 110 |
| Foam Layer Density (g/cm³) | 0.58 | 0.63 | 0.51 | 0.55 | 0.65 | 0.48 | 0.51 | 0.68 |
| Peel Strength (kgf/inch) | 4.2 | 4.5 | 3.8 | 4.3 | 4.6 | 3.9 | 3.8 | 3.9 |
| Pass/Fail Determination | Pass | Fail | Pass | Pass | Fail | Pass | Pass | Fail |

TABLE 3

| Raw material | | Comp. Ex. 1 | Ex. 9 | Comp. Ex. 9 | Ex. 10 | Comp. Ex. 10 | Ex. 11 | Comp. Ex. 11 | Ex. 12 | Comp. Ex. 12 | Ex. 13 | Comp. Ex. 13 |
|---|---|---|---|---|---|---|---|---|---|---|---|---|
| PTHF2000 | gel point: 4 mL | 100 | 70 | 80 | 70 | 80 | 70 | 80 | 70 | 80 | 70 | 80 |
| AC4510 | gel point: 31 mL | | 30 | 20 | | | | | | | | |
| AC4050 | gel point: 34 mL | | | | 30 | 20 | | | | | | |
| AC3810 | gel point: 41 mL | | | | | | 30 | 20 | | | | |
| AC4505 | gel point: 43 mL | | | | | | | | 30 | 20 | | |
| AC3805 | gel point: 48 mL | | | | | | | | | | 30 | 20 |
| MDI | | 25 | 32.5 | 30 | 42.5 | 40 | 32.5 | 30 | 47.5 | 40 | 47.5 | 40 |
| NCO/OH | | 2.0 | 2.0 | 2.0 | 2.0 | 2.0 | 2.0 | 2.0 | 2.0 | 2.0 | 2.0 | 2.0 |
| Water-containing Treatment of Base Material (Water Content) | | Yes (30%) | Yes (30%) | Yes (30%) | Yes (30%) | Yes (30%) | Yes (30%) | Yes (30%) | Yes (30%) | Yes (30%) | Yes (30%) | Yes (30%) |
| Foam Layer Thickness (μm) | | 80 | 140 | 110 | 130 | 110 | 150 | 130 | 170 | 120 | 200 | 100 |
| Foam Layer Density (g/cm³) | | 0.80 | 0.56 | 0.68 | 0.55 | 0.65 | 0.55 | 0.65 | 0.45 | 0.63 | 0.38 | 0.64 |
| Peel Strength (kgf/inch) | | 1.2 | 3.8 | 4.0 | 3.5 | 3.9 | 3.6 | 4.0 | 3.1 | 3.8 | 2.8 | 3.5 |
| Pass/Fail Determination | | Fail | Pass | Fail | Pass | Fail | Pass | Fail | Pass | Fail | Pass | Fail |

TABLE 4

| Raw material | | Comp. Ex. 1 | Ex. 14 | Comp. Ex. 14 | Ex. 15 | Comp. Ex. 15 | Ex. 16 | Comp. Ex. 16 | Ex. 17 | Comp. Ex. 17 | Ex. 18 | Comp. Ex. 18 |
|---|---|---|---|---|---|---|---|---|---|---|---|---|
| PTHF2000 | gel point: 4 mL | 100 | 90 | 95 | 90 | 95 | 90 | 95 | 90 | 95 | 90 | 95 |
| DC-1800E | gel point: >50 mL | | 10 | 5 | | | | | | | | |
| BP3025 | gel point: >50 mL | | | | 10 | 5 | | | | | | |
| BE7015 | gel point: >50 mL | | | | | | 10 | 5 | | | | |
| PEG1000 | gel point: >50 mL | | | | | | | | 10 | 5 | | |
| PEG2000 | gel point: >50 mL | | | | | | | | | | 10 | 5 |
| MDI | | 25 | 25.3 | 25.2 | 24.5 | 24.8 | 25.8 | 25.4 | 27.5 | 26.3 | 25 | 25 |
| NCO/OH | | 2.0 | 2.0 | 2.0 | 2.0 | 2.0 | 2.0 | 2.0 | 2.0 | 2.0 | 2.0 | 2.0 |
| Water-containing Treatment of Base Material (Water Content) | | Yes (30%) | Yes (30%) | Yes (30%) | Yes (30%) | Yes (30%) | Yes (30%) | Yes (30%) | Yes (30%) | Yes (30%) | Yes (30%) | Yes (30%) |
| Foam Layer Thickness (μm) | | 80 | 200 | 120 | 180 | 110 | 250 | 120 | 260 | 120 | 230 | 110 |
| Foam Layer Density (g/cm³) | | 0.80 | 0.39 | 0.64 | 0.42 | 0.65 | 0.31 | 0.64 | 0.28 | 0.63 | 0.37 | 0.62 |
| Peel Strength (kgf/inch) | | 1.2 | 2.9 | 3.8 | 3.2 | 3.9 | 2.8 | 3.5 | 2.5 | 3.2 | 3.0 | 3.3 |
| Pass/Fail Determination | | Fail | Pass | Fail | Pass | Fail | Pass | Fail | Pass | Fail | Pass | Fail |

From Tables 2 to 4, it was found that the present examples had a good foaming degree.

TABLE 5

| Raw material | | Comp. Ex. 1 | Comp. Ex. 19 | Comp. Ex. 2 | Comp. Ex. 20 | Comp. Ex. 4 | Comp. Ex. 21 | Ex. 6 |
|---|---|---|---|---|---|---|---|---|
| PTHF2000 | gel point: 4 mL | 100 | 100 | | | | | 50 |
| UH200 | gel point: 9 mL | | | 100 | 100 | | | |
| AC4002 | gel point: 19 mL | | | | | 100 | 100 | |
| AC4001 | gel point: 24 mL | | | | | | | 50 |
| AC4050 | gel point: 34 mL | | | | | | | |
| AC4505 | gel point: 43 mL | | | | | | | |
| MDI | | 25 | 25 | 25 | 25 | 25 | 25 | 37.5 |
| NCO/OH | | 2.0 | 2.0 | 2.0 | 2.0 | 2.0 | 2.0 | 2.0 |
| Water-containing Treatment of Base Material (Water Content) | | Yes (30%) | Yes (50%) | Yes (30%) | Yes (50%) | Yes (30%) | Yes (50%) | Yes (30%) |
| Foam Layer Thickness (μm) | | 80 | 100 | 70 | 100 | 110 | 120 | 140 |
| Foam Layer Density (g/cm³) | | 0.80 | 0.78 | 0.80 | 0.76 | 0.65 | 0.63 | 0.55 |
| Peel Strength (kgf/inch) | | 1.2 | 1.1 | 1.8 | 1.5 | 2.3 | 2.0 | 4.3 |
| Pass/Fail Determination | | Fail | Fail | Fail | Fail | Fail | Fail | Pass |

TABLE 5-continued

| Raw material | | Ex. 19 | Ex. 10 | Ex. 20 | Ex. 12 | Ex. 21 | Comp. Ex. 22 |
|---|---|---|---|---|---|---|---|
| PTHF2000 | gel point: 4 mL | 50 | 70 | 70 | 70 | 70 | 70 |
| UH200 | gel point: 9 mL | | | | | | |
| AC4002 | gel point: 19 mL | | | | | | |
| AC4001 | gel point: 24 mL | 50 | | | | | |
| AC4050 | gel point: 34 mL | | | 30 | 30 | | |
| AC4505 | gel point: 43 mL | | | | | 30 | 30 | 30 |
| MDI | | 37.5 | 42.5 | 42.5 | 47.5 | 47.5 | 47.5 |
| NCO/OH | | 2.0 | 2.0 | 2.0 | 2.0 | 2.0 | 2.0 |
| Water-containing Treatment of Base Material (Water Content) | | Yes (50%) | Yes (30%) | Yes (50%) | Yes (30%) | Yes (50%) | Yes (80%) |
| Foam Layer Thickness (μm) | | 160 | 130 | 150 | 170 | 190 | 230 |
| Foam Layer Density (g/cm³) | | 0.50 | 0.55 | 0.51 | 0.45 | 0.40 | 0.05 |
| Peel Strength (kgf/inch) | | 3.5 | 3.5 | 3.1 | 3.1 | 2.8 | 0.7 |
| Pass/Fail Determination | | Pass | Pass | Pass | Pass | Pass | Fail |

TABLE 6

| Raw material | | Comp. Ex. 23 | Ex. 15 | Ex. 22 | Comp. Ex. 24 | Ex. 23 | Ex. 16 | Ex. 24 |
|---|---|---|---|---|---|---|---|---|
| PTHF2000 | gel point: 4 mL | 90 | 90 | 90 | 90 | 90 | 90 | 90 |
| BP3025 | gel point: >50 mL | 10 | 10 | 10 | | | | |
| BE7015 | gel point: >50 mL | | | | 10 | 10 | 10 | 10 |
| PEG1000 | gel point: >50 mL | | | | | | | |
| PEG2000 | gel point: >50 mL | | | | | | | |
| MDI | | 24.5 | 24.5 | 24.5 | 25.8 | 25.8 | 25.8 | 25.8 |
| NCO/OH | | 2.0 | 2.0 | 2.0 | 2.0 | 2.0 | 2.0 | 2.0 |
| Water-containing Treatment of Base Material (Water Content) | | No | Yes (30%) | Yes (50%) | No | Yes (15%) | Yes (30%) | Yes (50%) |
| Foam Layer Thickness (μm) | | 70 | 180 | 250 | 70 | 170 | 250 | 270 |
| Foam Layer Density (g/cm³) | | 0.63 | 0.42 | 0.3 | 0.64 | 0.45 | 0.31 | 0.28 |
| Peel Strength (kgf/inch) | | 4.1 | 3.2 | 2.6 | 4.2 | 3 | 2.8 | 2.5 |
| Pass/Fail Determination | | Fail | Pass | Pass | Fail | Pass | Pass | Pass |

| Raw material | | Comp. Ex. 25 | Ex. 25 | Ex. 17 | Comp. Ex. 26 | Ex. 26 | Ex. 18 | Comp. Ex. 27 |
|---|---|---|---|---|---|---|---|---|
| PTHF2000 | gel point: 4 mL | 90 | 90 | 90 | 90 | 90 | 90 | 90 |
| BP3025 | gel point: >50 mL | | | | | | | |
| BE7015 | gel point: >50 mL | | | | | | | |
| PEG1000 | gel point: >50 mL | 10 | 10 | 10 | | | | |
| PEG2000 | gel point: >50 mL | | | | 10 | 10 | 10 | 10 |
| MDI | | 27.5 | 27.5 | 27.5 | 25 | 25 | 25 | 25 |
| NCO/OH | | 2.0 | 2.0 | 2.0 | 2.0 | 2.0 | 2.0 | 2.0 |
| Water-containing Treatment of Base Material (Water Content) | | No | Yes (15%) | Yes (30%) | No | Yes (15%) | Yes (30%) | Yes (80%) |
| Foam Layer Thickness (μm) | | 70 | 180 | 260 | 70 | 170 | 230 | 300 |
| Foam Layer Density (g/cm³) | | 0.67 | 0.4 | 0.28 | 0.62 | 0.45 | 0.37 | 0.02 |
| Peel Strength (kgf/inch) | | 3.2 | 2.8 | 2.5 | 3.9 | 3.1 | 3 | 0.3 |
| Pass/Fail Determination | | Fail | Pass | Pass | Fail | Pass | Pass | Fail |

From Tables 5 and 6, when the water content of the base material was 15 to 50% by mass, a good foaming degree and a favorable peeling strength were obtained.

TABLE 7

| Raw material | | Comp. Ex. 28 | Comp. Ex. 29 | Comp. Ex. 20 | Comp. Ex. 30 | Comp. Ex. 21 | Comp. Ex. 31 | Ex. 27 | Ex. 28 |
|---|---|---|---|---|---|---|---|---|---|
| PTHF2000 | gel point: 4 mL | 100 | 100 | | | | | 50 | 70 |
| UH200 | gel point: 9 mL | | | 100 | 100 | | | | |
| AC4002 | gel point: 19 mL | | | | | 100 | 100 | | |
| AC4001 | gel point: 24 mL | | | | | | | 50 | |
| AC4050 | gel point: 34 mL | | | | | | | | 30 |
| MDI | | 25 | 25 | 25 | 25 | 25 | 25 | 37.5 | 42.5 |
| NCO/OH | | 2.0 | 2.0 | 2.0 | 2.0 | 2.0 | 2.0 | 2.0 | 2.0 |
| Water-containing Treatment of Base Material (Water Content) | | Yes (50%) | Yes (50%) | Yes (50%) | Yes (50%) | Yes (50%) | Yes (50%) | Yes (15%) | Yes (15%) |
| Water Vapor Treatment after | | No | Yes | No | Yes | No | Yes | Yes | Yes |

TABLE 7-continued

| Raw material | Comp. Ex. 28 | Comp. Ex. 29 | Comp. Ex. 20 | Comp. Ex. 30 | Comp. Ex. 21 | Comp. Ex. 31 | Ex. 27 | Ex. 28 |
|---|---|---|---|---|---|---|---|---|
| Bonding (40-50° C./90% RH/30 sec.) | | | | | | | | |
| Foam Layer Thickness (μm) | 100 | 110 | 100 | 110 | 120 | 130 | 150 | 160 |
| Foam Layer Density (g/cm$^3$) | 0.78 | 0.71 | 0.76 | 0.69 | 0.63 | 0.53 | 0.53 | 0.50 |
| Peel Strength (kgf/inch) | 1.1 | 1.0 | 1.5 | 1.3 | 2.9 | 1.3 | 3.2 | 3.1 |
| Pass/Fail Determination | Fail | Fail | Fail | Fail | Fail | Fail | Pass | Pass |

TABLE 8

| Raw material | | Ex. 29 | Ex. 23 | Ex. 30 | Comp. Ex. 25 | Comp. Ex. 26 | Comp. Ex. 32 |
|---|---|---|---|---|---|---|---|
| PTHF2000 | gel point: 4 mL | 90 | 90 | 90 | 90 | 90 | 70 |
| BP3025 | gel point: >50 mL | 10 | | | | | |
| BE7015 | gel point: >50 mL | | 10 | 10 | | | |
| PEG1000 | gel point: >50 mL | | | | 10 | | |
| PEG2000 | gel point: >50 mL | | | | | 10 | 30 |
| | MDI | 24.5 | 25.8 | 25.8 | 27.5 | 25 | 25 |
| | NCO/OH | 2.0 | 2.0 | 2.0 | 2.0 | 2.0 | 2.0 |
| Water-containing Treatment of Base Material (Water Content) | | Yes (15%) | Yes (15%) | Yes (15%) | No | No | No |
| Water Vapor Treatment after Bonding (40-50° C./90%RH/30 sec.) | | Yes | No | Yes | No | No | No |
| Foam Layer Thickness (μm) | | 150 | 170 | 210 | 70 | 70 | 80 |
| Foam Layer Density (g/cm$^3$) | | 0.54 | 0.58 | 0.32 | 0.67 | 0.62 | 0.63 |
| Peel Strength (kgf/inch) | | 3.0 | 3.3 | 2.8 | 3.2 | 3.9 | 3.0 |
| Pass/Fail Determination | | Pass | Pass | Pass | Fail | Fail | Fail |

From Tables 7 and 8, it can be seen that the foaming degree is increased in the water vapor treatment (water vapor contact step) after the bonding. However, in the case of the base fabric having no water content even in the case of the grade having strong hydrophilicity which is most likely to foam, the base fabric did not foam sufficiently even when the water vapor treatment was performed after the bonding.

TABLE 9

| Raw material | | Comp. Ex. 2 | Ex. 31 | Ex. 32 | Ex. 33 | Ex. 34 | Ex. 35 | Ex. 36 | Ex. 37 | Ex. 38 | Ex. 39 |
|---|---|---|---|---|---|---|---|---|---|---|---|
| PTHF2000 | gel point: 4 mL | | | 20 | | 20 | | 20 | | 20 | |
| UH200 | gel point: 9 mL | 100 | 50 | 50 | 70 | 50 | 70 | 70 | 90 | 70 | 90 |
| AC4001 | gel point: 24 mL | | 50 | | | | | | | | |
| AC4050 | gel point: 34 mL | | | 30 | 30 | | | | | | |
| AC4505 | gel point: 43 mL | | | | | 30 | 30 | | | | |
| BP3025 | gel point: >50 mL | | | | | | | 10 | 10 | | |
| PEG2000 | gel point: >50 mL | | | | | | | | | 10 | 10 |
| | MDI | 25 | 37.5 | 47.5 | 47.5 | 47.5 | 47.5 | 24.5 | 24.5 | 25 | 25 |
| | NCO/OH | 2.0 | 2.0 | 2.0 | 2.0 | 2.0 | 2.0 | 2.0 | 2.0 | 2.0 | 2.0 |
| Water-containing Treatment of Base Material (Water Content) | | Yes (30%) | Yes (30%) | Yes (30%) | Yes (30%) | Yes (30%) | Yes (30%) | Yes (30%) | Yes (30%) | Yes (30%) | Yes (30%) |
| Foam Layer Thickness (μm) | | 70 | 150 | 150 | 160 | 160 | 170 | 160 | 170 | 160 | 170 |
| Foam Layer Density (g/cm$^3$) | | 0.80 | 0.49 | 0.52 | 0.50 | 0.48 | 0.45 | 0.49 | 0.45 | 0.48 | 0.45 |
| Hydrolysis Resistance | | A | B | B | B | B | B | A | A | A | A |
| Peel Strength (kgf/inch) | | 1.8 | 3.1 | 3.3 | 3.3 | 3.2 | 3.1 | 3.3 | 3.1 | 3.2 | 3.0 |
| Pass/Fail Determination | | Fail | Pass | Pass | Pass | Pass | Pass | Pass | Pass | Pass | Pass |

It can be seen from Table 9 that when the urethane prepolymer contains the polycarbonate polyol component in an amount of 50% by mass or more based on all polyol components, the hydrolysis resistance is improved.

TABLE 10

| Raw material | | Comp-Ex. 33 | Ex. 40 | Ex. 2 | Ex. 41 | Comp. Ex. 34 |
|---|---|---|---|---|---|---|
| PTHF2000 | gel point: 4 mL | 50 | 50 | 50 | 50 | 50 |
| AC2105-100 | gel point: 22 mL | 50 | 50 | 50 | 50 | 50 |
| PEG1000 | gel point: >50 mL | | | | | |
| MDI | | 23.4 | 24.9 | 37.5 | 93.8 | 103.1 |
| NCO/OH | | 1.25 | 1.33 | 2.0 | 5.0 | 5.5 |
| Water-containing Treatment of | | Yes | Yes | Yes | Yes | Yes |
| Base Material (Water Content) | | (30%) | (30%) | (30%) | (30%) | (30%) |
| Foam Layer Thickness (μm) | | 110 | 140 | 150 | 230 | 300 |
| Foam Layer Density (g/cm$^3$) | | 0.71 | 0.59 | 0.55 | 0.20 | 0.07 |
| Peel Strength (kgf/inch) | | 3.6 | 4.2 | 4.0 | 2.0 | 1.1 |
| Pass/Fail Determination | | Fail | Pass | Pass | Pass | Fail |

From Table 10, even when the water content of the base material was the same, when the NCO/OH ratio was 1.33 to 5, a good foaming degree and a favorable peel strength were obtained.

REFERENCE SIGNS LIST

10: Porous layer structure
12: Base material A
14: Urethane foam layer
16: Base material B

The invention claimed is:

1. A porous layer structure, comprising:
   a base material and
   a urethane foam layer provided on the base material,
   wherein the urethane foam layer is a foam layer formed by foaming a urethane prepolymer having an isocyanate group, the urethane foam layer has a density of from 0.10 to 0.60 g/cm$^3$, and the urethane prepolymer substantially contains no volatile component and satisfies at least any one of compositions (A) to (C):
   (A) a composition comprising a polyol component (a) having a gel point of 20 ml or more and less than 30 ml in an amount of 50% by mass or more based on all polyol components;
   (B) a composition comprising a polyol component (b) having a gel point of 30 mL or more and less than 50 mL in an amount of 30% by mass or more based on all polyol components; and
   (C) a composition comprising a polyol component (c) having a gel point of 50 mL or more in an amount of 10% by mass or more based on all polyol components.

2. The porous layer structure according to claim 1, wherein the base material A before the urethane foam layer is provided is a water-containing base material A.

3. The porous layer structure according to claim 1, wherein the base material A is a polyester base fabric, and a peeling force for peeling the urethane foam layer from the base material A when the urethane foam layer is 200 μm thick is 1.5 kgf/inch or more.

4. The porous layer structure according to claim 1, wherein the urethane prepolymer comprises a polycarbonate polyol component in an amount of 50% by mass or more based on all polyol components.

5. The porous layer structure according to claim 1, wherein in the urethane prepolymer, a ratio of an isocyanate group equivalent of a polyisocyanate component to a hydroxy group equivalent of all the polyol components is from 1.33 to 5.0.

6. A method for producing the porous layer structure according to claim 1, the method comprising:
   subjecting a base material A to a water-containing treatment to obtain a water-containing base material A;
   coating a urethane prepolymer having an isocyanate group onto a base material B to form a urethane prepolymer coating film;
   bonding the water-containing base material A and the urethane prepolymer coating film formed on the base material B to produce a coating film structure; and
   subjecting the coating film structure to an aging treatment,
   wherein the urethane prepolymer substantially contains no volatile component and satisfies at least any one of compositions (A) to (C):
   (A) a composition comprising a polyol component (a) having a gel point of 20 mL or more and less than 30 mL in an amount of 50% by mass or more based on all polyol components;
   (B) a composition comprising a polyol component (b) having a gel point of 30 mL or more and less than 50 mL in an amount of 30% by mass or more based on all polyol components; and
   (C) a composition comprising a polyol component (c) having a gel point of 50 mL or more in an amount of 10% by mass or more based on all polyol components.

7. The method according to claim 6, further comprising:
   bringing water vapor into contact with the coating film structure between the bonding and the subjecting the coating film structure to an aging treatment.

* * * * *